Oct. 20, 1959  D. W. COLE  2,909,644
METHOD FOR MANUFACTURING COMPOSITE SANDWICH PANELS
Filed June 12, 1957
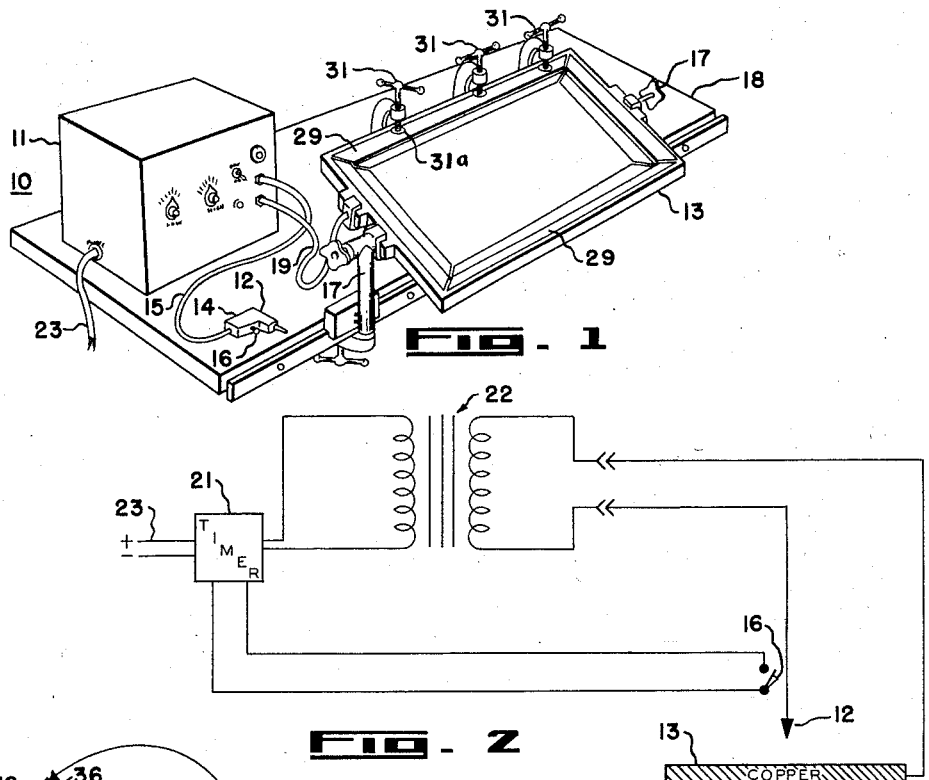
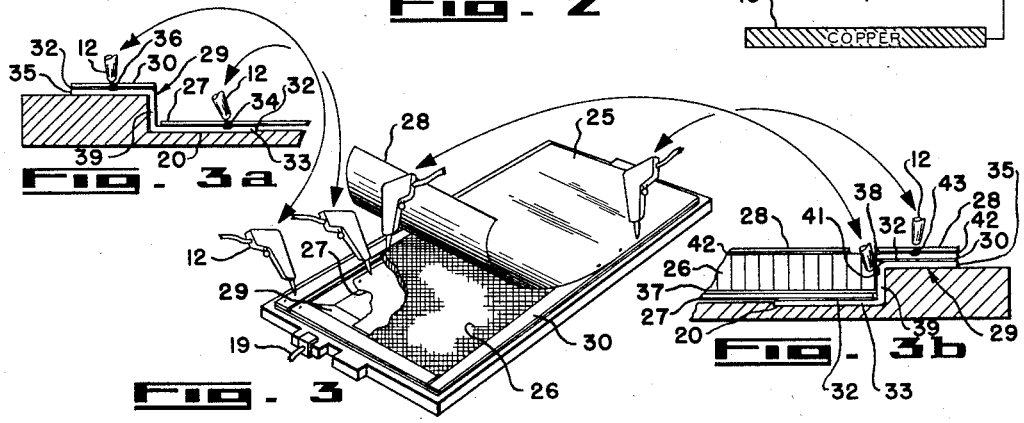
INVENTOR.
DONALD W. COLE
BY
*Walter J. Jason*
ATTORNEY

2,909,644

METHOD FOR MANUFACTURING COMPOSITE SANDWICH PANELS

Donald W. Cole, Weatherford, Tex., assignor to General Dynamics Corporation, San Diego, Calif., a corporation of Delaware Application June 12, 1957, Serial No. 665,300

5 Claims. (Cl. 219—117)

The present invention relates generally to a means and method for manufacturing cellular-cored sandwich constructions and more particularly to apparatus and process for quasi-permanently associating, in precise relationship, the component parts for a composite structure sufficient to permit necessary production processing, handling, transfer, and storage of the composite prior to the permanent integration of said components by brazing.

Modern high-speed aircraft and missiles are characterized by the exacting structural strength/weight and high temperature resistance demands made of essential structural components. It has been found that brazed stainless steel and titanium, cellular cored, sandwich panel constructions are particularly adapted to meet the exacting requirements of such airborne vehicles. These brazed panel structures are essentially of a single basic construction, although, as is obvious, they may assume various shapes and be of different sizes.

A typical panel consists of a cellular type core, such as in the form of a honeycomb of stainless steel foil, interposed between two facing sheets of light gauge stainless steel to form a sandwich-like composite. Such basic components, together with edge forming members, doublers, slugs, inserts and/or other necessary elements of the designer's choice, are simultaneously bonded together by a high temperature brazing process. Since the quality of the braze is directly dependent upon such environmental assembly conditions as "surgical" cleanliness (gloves must be worn while handling processed components), as well as upon exacting tolerance fits, and precise relationship of parts, it becomes desirable to semi-permanently assemble these panels in a precision jig prior to and in a different work area from the final, permanent integration of parts by brazing.

Contemporary methods normally utilized for semi-permanently associating components of a composite unit include bolts and nuts, screws, rivets, and welding. These methods are slow, inconvenient, and/or add weight if they must be left in the panel, but the most undesirable feature, common to all these methods, is that they do not allow for expansion of the metals when the panels are heated in the brazing furnace. A desideratum in quasi-permanent preassembly of strength/weight sandwich paneling, which is to be simultaneously integrated by brazing, is to effect holding of component parts in a definite fixed relation by a means that is fast to use, convenient, economical, precise, and strong, but that will (when the panel reaches high brazing temperatures) break the component parts loose, or "drift," thereby allowing flanges and skin to lie flat although details "grow" or expand.

It is therefore an object of the present invention to provide an improved means and method for producing quasi-permanently assembled sandwich panel units of the type that require brazing for permanent integration of components.

Another object of the invention is to provide improved apparatus and process for quasi-permanently associating, in precise relationship, the component parts of a composite structure, which association is sufficiently strong as to permit necessary production handling, transfer and storage prior to permanently integrating said components by brazing.

Yet another object of the invention is to provide novel apparatus and process for semi-permanently assembling component parts of a composite unit which will allow details to expand and flanges and skin to lie flat when exposed to brazing heat.

A still further object of this invention is the provision of a means and method for quasi-permanently affixing component parts of a composite structure in a precise relationship which involves the use of a quasi-permanent affixation medium which will blend with and become a part of the final permanent braze, leaving no contamination or excess weight due to first effecting a quasi-permanent assembly.

Another object of the invention is to provide apparatus and process of the above class and character that is suitable for use in clean, dust controlled, grease free environment, which is essential if braze contaminations that result in unsatisfactory bonds are to be avoided.

Yet another object resides in the provision of a simple and efficient quasi-permanent assembly means and process of the aforementioned class and character that is easy and economical to use, is particularly adapted for close tolerance work, and effectively and efficiently serves its intended purpose.

Other objects and features of the present invention will be readily apparent to those skilled in the art from the following specification and appended drawings wherein is illustrated a preferred form of the invention, and in which:

Figure 1 is a perspective view of apparatus employed in the present invention including a power/time resistance welder, with suitable controls, grounded to a sandwich panel jig.

Figure 2 is a schematic diagram of the power/time resistance welder.

Figure 3 is a cutaway view of a composite sandwich panel showing the relation of its component parts.

Figure 3a is an enlarged, partial cross-section of Figure 3 showing the inside skin and the doubler being brazed to a Z member and the preferred location of the brazing alloy.

Figure 3b is an enlarged, partial cross-sectional view of Figure 3 showing the cellular core being brazed to the Z, the outside skin being brazed to the doubler, and showing the overall quasi-fixed position of the brazing alloy; and Figure 4 illustrates the mitered corners of the Z members of a sandwich panel, and a preferred position of spot brazes in this area.

Referring now to the drawings, and particularly to Figure 1, there is illustrated a typical preassembly set-up in accordance with the present inveniton for assembling the component parts of a composite panel in a specific relationship before permanent integration of these components by brazing. This set-up comprises a conventional electrical resistance welding device 10, which includes a power unit 11 and a portable contactor or electrode 12, and a jig tool 13 which serves as the second electrode in the present welding system. Portable contactor 12 is conventionally termed a "poke" or "Gun" electrode, with the electrode being of elongated form with a blunt point and being made of hard copper or of a suitable copper alloy. This electrode is provided with a hand grip 14 of nonconducting material which permits handling of the electrode and which is connected to power unit 11 by an electrode wire 15. Hand grip 14 carries a usual, normally open, limit switch 16 which is in electrical association with the electrode and with a transformer and timer (which will later be more fully discussed) of power unit 11. For convenience and versatility electrode wire 15 of portable contactor 12 may be connected to power unit 11 by a quick disconnecting means such as a plug and socket.

Jig 13, herein illustrated, is in the form of a conductive platen of rectangular configuration which embodies or employs inserts of a suitable highly conductive material, such as copper. Jig 13 may, of course, assume any configuration which adapts it conveniently to the panel work to be performed thereupon. Suitable clamping devices 17 mount jig 13 to a work-table 18 and permit angular adjustment of the jig relative to the work-table as dictated by the work to be performed. A ground wire 19 connects jig 13 to power unit 11, being secured at one end to the jig 13 by a suitable clamp and connected at its other end to the power unit 11 by a suitable quick disconnect means such as a plug and socket. The surface of jig 13 may be suitably recessed to accept flanges of Z-section elements of a composite panel (later to be described) to assist in assembly of the panel.

Power unit 11 includes within its casing a usual timer and a suitable transformer which are indicated respectively by the numerals 21 and 22 in Figure 2. Figure 2 is a schematic wiring diagram illustrating the primary elements of the resistance welding system contemplated for use in the present invention. Timer 21 and transformer 22 are conventional electrical components and the specific details of their construction will not be discussed. Power is provided to power unit 11 from a suitable outside source through a line 23.

The operation of timer 21, which is normally inactive, is controlled by the normally open limit switch 16 carried by hand grip 14. Manual closing of switch 16 effects energization of timer 21 which then allows electrical current to reach transformer 22. Thereafter an electrical circuit may be completed by direct or indirect contact of portable electrode 12 and jig 13. When this indirect contact is made through two pieces of metal of the type and thickness for which the present system is designed or rated, the two metals fuse together at the spot or point of contact of portable electrode 12 to effect a small, resistance "tack weld." A metal alloy, which preferably is silver manganese, is employed herein between the two metal pieces to effect a "tack braze" rather than a "tack weld."

Figures 3, 3a and 3b illustrate the preferred relation and sequence in which a typical stainless steel sandwich panel 25 is quasi-permanently assembled by the "tack braze" method. Panel 25, which is shown herein is understood to be illustrative only of composite articles which may be accommodated by the present invention, comprises a cellular type core 26 in the form of a honeycomb of stainless-steel foil, an inner facing sheet 27 and an outer facing sheet 28 of light gauge stainless steel, a plurality of stainless-steel edge members 29 which here are in the form of Z-sections, and a plurality of elongated, strip-like, doublers or stiffening members 30.

In assembling panel 25, the edge members or Z-sections 29 are carefully clamped into position in picture-frame relationship on the supporting surface afforded by jig 13 by suitable clamps 31 which are of a number as would be necessary to perform the task. To avoid confusion in illustration the clamps are shown in Figure 1 as being applied to but one edge member. Clamps 31 include, clamping tips 31a which are of non-corrosive material, preferably rubber, to check contamination due to oxidation and corrosion.

After the Z-sections 29 are in place brazing alloy strips 32 are lightly tacked to the faces of the bottom legs or flanges 33 of the Z-sections 29. The inner skin 27, after first being treated on its inside face with a fluxing agent, is placed over strips 32 and then tack brazed, at a number of points by portable contactor 12, to Z-sections 29. One of these spots or points of tack brazing is indicated by the numeral 34 in Figure 3a. Brazing alloy strips 32 are, as above stated, preferably made of silver manganese and before being placed in position on the components of the panel 25 are treated on both sides with a fluxing agent, such as sodium tetraborate, to check contamination from air while panel 25 is being handled, and after pre-assembly, while it is stored prior to final permanent integration by brazing. This same fluxing agent may be employed to treat inner skin 27 and the other components of panel 25.

After the inner skin has been tack brazed to Z-sections 29 the clamps 31 are carefully removed and alloy strips 32 are tacked lightly to the upper legs 35 of Z-sections 29, and then the elongated doublers 30 are placed thereupon and tack brazed, by operation of portable contactors 12, to Z-sections 29. One of the spots or points of tack brazing is indicated in Figure 3a by the numeral 36.

The inside surface of inner skin 27 is then covered with a sheet 37 of the brazing alloy, which has been treated on both sides thereof with a fluxing agent; sheet 37 thereafter is lightly tacked down around the edge thereof by portable contactor 12. Here care is taken to tack only in the area of the sheet 37 which is above legs 33 of Z-sections 29 to avoid marking and weakening of the skin 27.

Strips 38 of brazing alloy, which have been treated on both sides with a fluxing agent, are lightly tacked to vertical legs 39 of Z-section members 29.

Core 26 is then fitted in place upon sheet 37 within the space defined by the vertical legs 39 of the circumscribing Z-section members 29; and thereafter core 26 is tack brazed at a number of spots 41 to such vertical legs. The existing structure is then covered with a sheet 42 of brazing alloy which has been treated with a fluxing agent and which is lightly tacked around its outside edges to doublers 30. Next the upper skin 28, which has been treated on its inner face with a fluxing agent, is tack brazed at a number of points 43 to the doublers 30.

Panel 25, after the upper skin 28 has been affixed, is then turned upside down and the mitered corners 44 of the Z-sections 29 are then tack brazed to doublers 30 at a number of places 45, as shown in Figure 4, to provide added strength in these areas. Thereafter panel 25 may be wrapped in paper or other suitable covering and placed in storage.

In making the components of the panel 25 a certain amount of space, as may be determined by calculation and experience, is allowed at the various miter corners, edge butts, and so forth, to allow for a predetermined percentage of growth for each linear foot of metal when subjected to the heat of brazing. Thus details are allowed to expand and the skins and flanges will lie flat when exposed to brazing heat. In performing the present invention care is taken to have the various components in a degreased and clean state when received, to carefully handle the parts during the preassembly operation, as with rubber gloves, and take care to maintain a clean, dust-controlled environment in the work area thereby to minimize the possibility of braze contamination.

The various tack brazing operations are readily performed by the workman by the use of the portable contactor or "poke" electrode 12. Each time that he desires to effect a tack braze he locates the point of the electrode at the desired spot and simply actuates the switch 16 which is conveniently situated with respect to his fingers. The necessary welding current is thereafter supplied by the power unit 11. The timer 21 of the power unit 11 is set as determined by the thicknesses of the parts involved and will permit the flow of current for the time necessary to effect the required tacking.

As thus described, the braze method of the present invention is characterized as an improved means and process that will effect a firmly associated assembly of components ready to be handled, transferred, stored, and finally to be permanently brazed into a composite sandwich panel at the time that a permanent association of the components is required.

While certain preferred embodiments of the invention have been specifically disclosed it is understood that the invention is not limited thereto as many variations will be readily apparent to those skilled in the art and the invention is to be given its broadest possible interpretation within the terms of the following claims.

What I claim is:

1. A method of maintaining the components of a structural composite metallic sandwich panel in a desired relationship preparatory to integration into a fixed whole, said components comprising peripheral metallic edge members, metallic stiffening members, a metallic cellular core and metallic facing sheets for the opposite sides of said core, which method comprises positioning said peripheral edge members upon an electrically conductive support, and then spot brazing, in fixed relationship to said edge members, said stiffening members, said cellular core, and said facing sheets to be disposed on opposite sides of said cellular core, said spot brazing of said components in position being by passing an electric current from an electrode and to said conductive support through interposed contiguous portions of said components.

2. A method of assembling in maintained relationship the components of a composite metallic sandwich panel preparatory to integration thereof into a fixed unit by brazing, said components comprising peripheral metallic edge members, a metallic cellular core and metallic facing sheets for opposite sides of said core, which method comprises positioning said peripheral edge members upon an electrically conductive support, and then positioning a layer of brazing material upon portions of said edge members and positioning a first facing sheet thereover and spot brazing said first facing sheet to said edge members, then positioning a layer of brazing material upon other portions of said edge members and positioning said cellular core upon said first facing sheet and spot brazing said cellular core to said other portions of said edge members, and thereafter supporting another layer of brazing material upon still other portions of said edge members, laying the other of said facing sheets thereover and over said cellular core and spot brazing said latter facing sheet to said edge members, said spot brazing of said components in position being by passing an electric current from an electrode and to said conductive support through interposed contiguous portions of said components.

3. A method of assembling in maintained relationship the components of a structural composite metallic sandwich panel preparatory to integration thereof into a fixed unit by brazing, said components comprising peripheral metallic edge members, a metallic cellular core and metallic facing sheets for opposite sides of said core, which method comprises positioning said peripheral edge members upon an electrically conductive support, and then positioning a layer of brazing material upon portions of said edge members and positioning a first facing sheet thereover and spot brazing said first facing sheet to said edge members, disposing a sheet of brazing material upon the interior face of said facing sheet, then positioning a layer of brazing material upon other portions of said edge members and positioning said cellular core upon said sheet of brazing material and spot brazing said cellular core to said other portions of said edge members, and thereafter supporting another sheet of brazing material over said cellular core to extend upon still other portions of said edge members, laying the other of said facing sheets thereover and spot brazing said latter facing sheet to said edge members, said spot brazing of said components in position being by passing an electric current from an electrode and to said conductive support through interposed contiguous portions of said components.

4. A method of assembling in maintained relationship the components of a structural composite metallic sandwich panel preparatory to integration thereof into a fixed unit by brazing, said components comprising peripheral metallic edge members, metallic stiffening members, a metallic cellular core and metallic facing sheets for opposite sides of said core, which method comprises positioning said peripheral edge members upon an electrically conductive support, and thereafter positioning a layer of brazing material upon portions of said edge members and positioning a first facing sheet thereover and spot brazing said first facing sheet to said edge member, disposing a layer of brazing material upon other portions of said edge members and overlying such material with said stiffening members and spot brazing the same to said edge member, disposing a sheet of brazing material upon the interior face of said facing sheet, then positioning a layer of brazing material on other portions of said edge members and positioning said cellular core upon said sheet of brazing material and spot brazing said cellular core to said other portions of said edge members, and thereafter disposing another sheet of brazing material to overlie said cellular core and said stiffening members and then laying the other of said facing sheets upon said last mentioned sheet of brazing material and spot brazing said latter facing sheet to said stiffening members, said spot brazing of said components in position being by passing an electric current from an electrode and to said conductive support through interposed contiguous portions of said components.

5. A method of assembling in maintained relationship the components of a structural composite metallic sandwich panel preparatory to permanent integration thereof into a fixed unit by brazing, said components comprising metallic edge members, metallic stiffening members, a metallic cellular core and metallic facing sheets for opposite sides of said core, which method comprises, positioning said edge members upon an electrically conductive support, attaching said core, said stiffening members and said facing sheets to various portions of said edge members by spot brazing at selected points at areas of contiguity of said core, stiffening members, and facing sheets with said edge members, there being located at such areas of contiguity a layer of brazing material, said spot brazing being effected by passing an electric current from an electrode and to said conductive support through such areas of contiguity.

References Cited in the file of this patent

UNITED STATES PATENTS

| 1,548,204 | Moesta | Aug. 4, 1925 |
| 2,324,435 | Smith | July 13, 1943 |
| 2,333,600 | Trautvetter | Nov. 2, 1943 |
| 2,746,789 | Ridgeway | May 22, 1956 |
| 2,796,510 | Herbert | June 18, 1957 |
| 2,810,816 | Hardesty | Oct. 22, 1957 |
| 2,813,191 | Gray | Nov. 12, 1957 |
| 2,820,136 | Bester | Jan. 14, 1958 |
| 2,820,882 | Johnson | Jan. 21, 1958 |
| 2,826,675 | Fullerton et al. | Mar. 11, 1958 |